United States Patent [19]

Anantharaman et al.

[11] Patent Number: 4,793,863

[45] Date of Patent: Dec. 27, 1988

[54] HIGH STRENGTH PIGMENTS FOR PRINTING INKS

[75] Inventors: Kalpathy R. Anantharaman; Susan T. Soward, both of Cincinnati, Ohio; Wilmeth M. Smoot, Crittenden, Ky.

[73] Assignee: Sun Chemical Corporation, Fort Lee, N.J.

[21] Appl. No.: 112,824

[22] Filed: Oct. 23, 1987

[51] Int. Cl.$^4$ .......................... C09C 3/00; C09D 11/08
[52] U.S. Cl. ........................................ 106/500; 106/30
[58] Field of Search ................ 106/308 M, 308 Q, 29, 106/30, 500

[56] References Cited

U.S. PATENT DOCUMENTS

| | | | |
|---|---|---|---|
| 4,028,119 | 6/1977 | Yamada et al. | 106/32 |
| 4,102,704 | 7/1978 | Fournier et al. | 106/288 Q |
| 4,190,568 | 2/1980 | Haney | 106/219 |

FOREIGN PATENT DOCUMENTS 1170802 7/1984 Canada .

*Primary Examiner*—Paul Lieberman
*Assistant Examiner*—Christine A. Skane
*Attorney, Agent, or Firm*—Jack Matalon

[57] ABSTRACT

Organic pigments especially suitable in the manufacture of printing inks. The pigments are prepared with relatively high concentrations of resins or rosins which are reacted with controlled amounts of an aluminum salt to obtain aluminum resinates or aluminum rosinates. The resulting resinated pigmentary compositions are characterized by high strength, better transparency, good rheology without loss of coloristic properties.

20 Claims, No Drawings

HIGH STRENGTH PIGMENTS FOR PRINTING INKS

FIELD OF THE INVENTION

The present invention relates to an improved method of preparing high strength organic pigments. More particularly, the invention pertains to making high strength organic pigments that are especially suitable for the manufacture of superior printing inks.

BACKGROUND OF THE INVENTION

As set forth in U.S. Pat. No. 4,102,704 (Fournier et al.), it is well known to incorporate modified or unmodified resins or rosins to improve the characteristics of pigmentary compositions intended for use in printing inks.

. In general, suitable additives include natural and synthetic resins. Rosin, often referred to as colophony, disproportioned rosin, hydrogenated rosin, and rosin derivatives are preferred resins for the present purposes. Such rosins have high compatibility with the binding agents employed in printing inks, have low softening points, as well as being soluble in an aqueous alkaline medium and substantially insoluble in an acidic medium.

Organic pigments are generally resinated or rosinated during or after the conventional coupling procedure to achieve better dispersion of the pigmentary particles resulting in increased strength, transparency, and depth of mass tone for the pigments. The resin or rosin is normally precipitated as free acid or as a metal salt of calcium, barium or zirconium. In U.S. Pat. No. 4,102,704, column 1, lines 26 through 35; French Pat. No. 1,538,270 and Belgian Pat. No. 660,978 are referred to for the foregoing teachings as well as the use of organic amines to react with the resin or rosin. Furthermore, the use of small quantities of wetting agents such as the oleic ester of triethanolamine is taught. The use of these additives are said to have the disadvantage of causing a loss in coloristic intensity.

The disadvantages of the prior art procedures are said to be overcome in U.S. Pat. No, 4,102,704 by incorporating modified or unmodified resin acids esterified with an amino alcohol in an acid aqueous solution containing the organic pigment. The esters are then precipitated by making the aqueous solution alkaline or by adding an acid which will form water insoluble salts. One of the features of the patented invention involves preparing the esters of the resin acids in a separate step.

Somewhat more recently, Canadian Pat. No. 1,170,802 proposes utilizing a high percentage of resin or rosin precipitated on the organic pigment as free acid to achieve high transparency and high tinctorial strength. However, when the manufacturing method of the Canadian Patent was utilized, for example, with a C.I. Pigment Yellow-12, and in conjunction with a flushing treatment, the resulting flush had low viscosity and consequently needed more gelled vehicles to build up yield values for the ink so that it in turn would print better.

It would be advantageous therefore to have available a method for making pigmentary compositions that avoided such prior art problems or commercial problems as additional processing steps, loss of color intensity, and undesirable viscosities when incorporated into ink. The product obtained by the practice of the method should lead to high strength, better transparency, and good rheological characteristics when used in printing inks.

SUMMARY OF THE INVENTION

In accordance with the present invention it has now been found that a high strength organic pigment composition can be prepared by utilizing a high resin or rosin content in a finished coupling and then precipitating the resin or rosin as aluminum resinate or aluminum rosinate by utilizing soluble aluminum salts. When used in formulating printing inks high strength, better transparency and good rheology properties result.

DETAILED DESCRIPTION OF THE INVENTION

In general, the pigmentary compositions of the present invention comprise adding a solution of an aluminum salt to an alkaline slurry of a finished pigment coupling, and then adding an alkaline solution of a modified or unmodified resin or rosin. The pH is then made acidic and aluminum resinate as well as unreacted resin or rosin precipitate out and are separated from the solution and dried. The resulting granules or particles are suitable for use in the formulation of printing ink, which is another feature of the present invention.

It is within the scope of the invention to initially add the alkaline solution of resin or rosin to the alkaline slurry. However, it was unexpectedly found that the initial addition of the aluminum salt solution leads to superior rheology.

The method of the invention can be carried out using conventional organic pigments, but it is of particular use in the area of pigments used for the printing ink industry. Illustrative pigments include azo pigments, laked azo pigments, and phthalocanine pigments; the use of azo diarylide yellow pigments are especially preferred. The pigment slurry feed can either be dilute, i.e. 1–2% pigment, or concentrated, i.e. 2–15% pigment based on the weight of the slurry.

The resins or rosins employed may be of those discussed above or mixtures thereof. The use of a rosin is especially preferred. For most purposes, the amount of resin or rosin used can range from about 90 to 100% by weight based on the weight of the organic pigment. The use of about 100% by weight is preferred. The resin or rosin is used in an alkaline aqueous solution such as a caustic soda solution. It should be understood, however, that other alkalies may be employed.

Aluminum salts useful in the practice of the present invention include those which are water soluble such as aluminum sulfate, aluminum chloride, aluminum nitrate, etc. Preferred aluminum salts are aluminum sulfate and aluminum chloride.

The amount of aluminum salt employed is an important feature of the invention. It has been found that the rheology of the organic pigment product may be changed to suit, for example, printing ink needs, by adjusting the amount of aluminum salt available for reaction with the resin or rosin. More specifically, if a high excess of the theoretical or stoichiometric amount of aluminum necessary to react with the resin or rosin is employed, the product has very poor rheology and poor gloss. Thus, the amount of aluminum salt employed is generally not more than about 100% of the stoichiometric amount necessary; preferred aluminum salt amounts range from about 50 to 75% of the stoichiometric amount.

In the present invention, a pigment suspension is heated to an elevated temperature, e.g. about 40° to 90° C., and the pH adjusted to the alkaline side, e.g. 9 to 11, preferably from 10.5 to 11.0, by using an alkaline solution of caustic soda, for example.

Next, an aqueous solution of an aluminum salt is added to the pigment slurry, and this is followed by the addition of the resin or rosin in the form of an alkaline solution, e.g. a 50% caustic soda solution. The pigment suspension is generally agitated during these addition steps. The pH of the slurry is then made acidic, the preferred pH being between 6.0 to 6.5. This change in pH can be accomplished by the addition of acids such as acetic acid, hydrochloric acid, or phosphoric acid. The aluminum resinate or rosinate as well as any free resin or rosin precipitated out of solution, and the resulting slurry is filtered, the particles or granules washed to obtain a neutral pH, and then dried at a temperature ranging from about 45° to 60° C., preferably from 45° to 55° C.

It is another aspect of the present invention to employ the novel pigmentary compositions in the manufacture of printing inks for commercial applications. Printing inks are conventionally made either by (1) using a flush base made out of pigment presscake in a high shear Sigma Blade mixer or (2) by dry grinding a dry pigment with suitable printing ink vehicles in a high shear machine such as a 3-roll mill. The resulting products are then cut back with suitable let down vehicles, solvents, etc. to meet the requirement of printing ink needs. In the flush process using a Sigma Blade machine, the pigment is preferably transferred into the oleophilic media, while the water which separates out is poured off. The product is washed to low conductivity, if necessary, and then dried to low moisture levels. The dried flush is cut back with suitable varnishes, solvents, etc. to meet appropriate printing ink needs.

The present invention can be carried out in a dilute or concentrated pigment slurry, but can be advantageously done using a concentrated coupling and the resultant pigment slurry is flushed in a Sigma Blade mixer using resin solutions, which are known in the art as varnishes or flushing varnishes, alkyds and other solvents. The finished flush is then cut back with solvents, varnishes and other cut back vehicles to the consistency required of a printing ink or flush base. Such a procedure has the advantage over using regular presscake in flush because the pigmentary particles obtained are in an extremely fine state of dispersion, and achieve high tinctorial strength, much improved transparency, and better dispersion in the vehicle. The ink so prepared using the invention has up to 35% more tinctorial strength based on Yellow-12 content compared to a conventionally made product with little or no rosin or resin and made under similar conditions.

Alternatively, the pigment made according to the invention can be isolated in a filter press, washed salt free and the presscake flushed in a Sigma Blade mixer to obtain similar results. The pigment can also be washed salt free and dried in an air oven at 50°-60° C., and the resultant dry pigment can be incorporated into printing ink vehicles using a high shear equipment such as a 3-roll mill or a high shear mixer.

The invention will be more fully understood by reference to the following embodiments.

EXAMPLE 1

A pigment suspension containing 250 parts of C I. Pigment Yellow-12 (Colour Index No. 21090) in a final coupling volume of 2900 parts (8.5% pigment concentration) was prepared by coupling at 12°-14° C. and at a final pH of 2.8-3.4. The finished coupling was then heated to 40°-45° C. The pH of the pigment slurry was adjusted to 10-10.8, preferably 10.5-10.8, with caustic soda. A solution of a soluble aluminum salt containing 5.5 parts of aluminum, i.e. about 75 of the theoretical aluminum needed for the amount of rosin used, was added under agitation. Next 243 parts of a modified rosin (melting point 75°-100° C.) as a 20-25% solution in 70.7 parts of 50% caustic soda was added with agitation and the pH readjusted to 6.0-6.5 with dilute acetic acid. The above slurry when filtered, washed to neutral pH, dried in an oven at 50°-60° C. and tested against a non-resinated product using #1 Iso alkyd varnish (No. 1 Super Florite Aklyd supplied by Iovite Inc.) in the conventional Hoover Muller Test showed equal or 3-5% stronger color strength with much transparency and depth of mass tone. Thus, 1 gram of the new product containing 50.2% Yellow-12 pigment had equal or better strength to 1 gram of a regular Yellow-12 made without the rosin and aluminum salt.

The pigment slurry obtained from above was flushed into a hydrocarbon resin varnish in magie oil (Magiesol 47 supplied by Magie Bros. Oil Company of Franklin Park, Ill.) using a high shear Sigma Blade mixer, washed to low conductivity with water and then dried under vacuum to low moisture. The product was then cut back with the varnish and solvents to a flush base. This product when tested against a conventionally prepared Yellow-12 slurry with no modifications, and subsequently flushed and converted to a flush base showed a strength advantage of 30-35%, based on Yellow-12 content, with good transparency and good rheology.

EXAMPLE 2

The procedure of Example 1 was repeated with the exception that the aluminum salt solution used contained 3.62 parts aluminum, i.e. about 50% of the theoretical aluminum required for the amount of rosin employed. The resulting product, when tested, showed a similar strength advantage and better rheological properties.

EXAMPLE 3

Following the procedure of Example 1, a series of runs were carried out with varying amounts of aluminum salt to demonstrate that greater than 100% stoichiometric amounts must be avoided to avoid undesirable product viscosities.

| Runs | Rosin Based On Weight of Yellow-12 | Al Salt Based On Stoichiometric Amount of Rosin | Flush Viscosity* |
|------|------|------|------|
| A | 100% | 100% | 544.4 |
| B | 100% | 75% | 285.5 |
| C | 100% | 167% | Too High To Measure |

*Poises determined by Laray Viscometer.

The above data demonstrate that the practice of the present invention leads to unexpected and superior results without the necessity of additional processing steps or encountering viscosity and color intensity problems.

While the invention has been illustrated above by preferred features, it will be understood that the invention is subject to variations and modifications without departing from its broader concepts.

What is claimed is:

1. A method for making a resonated pigmentary composition comprising the steps of:
   contacting an organic pigment with a dispersion enhancer selected from the group consisting of resins, rosins and mixtures of the foregoing, said dispersion enhancer being present in an amount between about 90% and about 100% by weight of said organic pigment;
   contacting said dispersion enhancer with an amount of an aluminum salt effective to form aluminum resinate or rosinate by combining with at least about 50% of said dispersion enhancer, said aluminum salt being present in a concentration below stoichiometric amount.

2. The method according to claim 1, wherein said aluminum salt is contacted with said organic pigment prior to said dispersion enhancer being contacted with said organic pigment.

3. The method according to claim 1, wherein said organic pigment is selected from the group consisting of azo pigments, phthalocyanine pigments, and mixtures thereof.

4. The method according to claim 3, wherein said organic pigment is an azo-diarylide pigment.

5. The method according to claim 1, wherein said aluminum salt is present in an amount effective to provide between about 50% and about 70% of the stoichiometric amount of aluminum theoretically needed to combine with all of said dispersion enhancer.

6. The method according to claim 1, wherein said aluminum salt is aluminum chloride or aluminum sulfate.

7. The method according to claim 1, wherein said organic pigment is present in an alkaline aqueous slurry.

8. A method for making a resinated pigmentary composition comprising the steps of:
   a. contacting an organic pigment with an aluminum salt to form a mixture;
   b. subsequently contacting said mixture with a dispersion enhancer selected from the group consisting of resins, rosins, and mixtures thereof;
   the stoichiometric ratio of dispersion enhancer to aluminum contributed by said aluminum salt being from about 2:1 to about 1:1.

9. The method according to claim 8, wherein said dispersion enhancer is present in an amount between about 90% and 100% by weight of said organic pigment.

10. The method according to claim 8, wherein said aluminum salt is added to said alkaline aqueous slurry prior to the addition of said dispersion enhancer.

11. The method according to claim 8, wherein said organic pigment is selected from the group consisting of azo pigment, phthalocyanine pigments, and mixtures thereof.

12. The method according to claim 8, wherein said organic pigment is an azo-diarylide pigment.

13. The method according to claim 8, wherein said aluminum salt is present in an amount effective to provide between about 50% and about 70% of the stoichiometric amount of aluminum theoretically needed to bind all of said dispersion enhancer.

14. The method according to claim 8, wherein said aluminum salt is aluminum chloride or aluminum sulfate.

15. The method according to claim 8, wherein said organic pigment is present in an aqueous organic slurry.

16. A resinated pigmentary composition comprising an organic pigment, from about 90% to about 100% by weight of said pigment of a dispersion enhancer selected from the group consisting of resins, rosins, aluminum resinates, aluminum rosinates and mixtures thereof, wherein about 50% to about 100% (by molar quantity) of said dispersion enhancer is an aluminum resinate or rosinate.

17. The composition according to claim 16, wherein said composition is prepared by adding an aluminum salt to an alkaline aqueous slurry of organic pigment and then adding to said slurry a dispersion enhancer selected from the group consisting of resins, rosins and mixtures thereof.

18. The composition according to claim 16, wherein said organic pigment is selected from the group consisting of azo pigments, phthalocynanine pigments, nnd mixtures thereof.

19. The composition according to claim 16, wherein said organic pigment is an azo-diarylide pigment, and said aluminum salt is aluminum chloride or aluminum sulfate.

20. The composition according to claim 16, wherein said aluminum salt is present in an amount effective to provide between about 50% and about 70% of the stoichiometric amount of aluminum theoretically needed to bind all of said dispersion enhancer.

* * * * *